United States Patent
Yajima

(10) Patent No.: US 9,880,793 B2
(45) Date of Patent: Jan. 30, 2018

(54) IMAGE INFORMATION CONVERTING APPARATUS, IMAGE FORMING APPARATUS, IMAGE INFORMATION CONVERTING SYSTEM, NON-TRANSITORY COMPUTER READABLE MEDIUM STORING IMAGE INFORMATION CONVERTING PROGRAM AND IMAGE INFORMATION CONVERTING METHOD

(71) Applicant: FUJI XEROX CO., LTD., Tokyo (JP)

(72) Inventor: Masahiko Yajima, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 29 days.

(21) Appl. No.: 15/209,517

(22) Filed: Jul. 13, 2016

(65) Prior Publication Data

US 2017/0235531 A1    Aug. 17, 2017

(30) Foreign Application Priority Data

Feb. 17, 2016   (JP) .................................. 2016-028212

(51) Int. Cl.
*G06F 3/12*   (2006.01)
*G06K 15/02*  (2006.01)

(52) U.S. Cl.
CPC ............ *G06F 3/1247* (2013.01); *G06F 3/126* (2013.01); *G06F 3/1248* (2013.01); *G06F 3/1251* (2013.01); *G06K 15/022* (2013.01)

(58) Field of Classification Search
None
See application file for complete search history.

(56) References Cited

U.S. PATENT DOCUMENTS

| | | | | |
|---|---|---|---|---|
| 7,554,681 B2* | 6/2009 | Bellagamba | .......... | G06F 3/1205 358/1.12 |
| 8,233,185 B2* | 7/2012 | Gordon | ................. | G06F 3/1212 345/504 |
| 8,823,997 B2* | 9/2014 | Hayakawa | ......... | G06K 15/1822 358/1.15 |
| 8,964,241 B2* | 2/2015 | Mizuguchi | ............ | G06F 3/1211 358/1.13 |
| 2010/0103444 A1* | 4/2010 | Farrell | ................. | G06F 3/1205 358/1.15 |

FOREIGN PATENT DOCUMENTS

JP    H11-58177 A    3/1999

* cited by examiner

*Primary Examiner* — Paul F Payer
(74) *Attorney, Agent, or Firm* — Oliff PLC

(57) ABSTRACT

An image information converting apparatus according to one embodiment includes a converting unit, a splitting unit and an adding unit. The converting unit converts first image information described in a first language into second image information described in a second language, the second language being different from the first language. The splitting unit splits the first image information into a plurality of split image files so as to each have a data size satisfying a restriction in image processing performed by the second image forming apparatus. The adding unit adds first additional information to each of the split image files. The first additional information indicates whether or not to add an image formation unit mark. The image formation unit mark indicates boundaries between batches of image formation units corresponding to images to be formed on a plurality of pages.

14 Claims, 16 Drawing Sheets

| SPECIFICATION | IMAGE FORMING APPARATUS A | IMAGE FORMING APPARATUS B | IMAGE FORMING APPARATUS C |
|---|---|---|---|
| DATA SIZE RESTRICTION | | | ... |
| PAPER TYPE | | | ... |
| PAPER SIZE RESTRICTION | | | ... |
| NUMBER OF IMPOSITIONS | | | ... |
| CUTTING POSITION | | | ... |
| ... | ... | ... | ... |

*Fig. 3*

| COPY MARK | IMAGE FORMATION UNIT MARK | IMPOSITION SETTING NAME |
|---|---|---|
| COPY1 | OUTPUT | AAA_1 |
| | NOT OUTPUT | AAA_1N |
| COPY2 | OUTPUT | AAA_2 |
| | NOT OUTPUT | AAA_2N |

*Fig. 8*

IMAGE INFORMATION CONVERTING APPARATUS, IMAGE FORMING APPARATUS, IMAGE INFORMATION CONVERTING SYSTEM, NON-TRANSITORY COMPUTER READABLE MEDIUM STORING IMAGE INFORMATION CONVERTING PROGRAM AND IMAGE INFORMATION CONVERTING METHOD

CROSS-REFERENCE TO RELATED APPLICATIONS

This application is based on and claims priority under 35 USC 119 from Japanese Patent Application No. 2016-028212 filed on Feb. 17, 2016.

BACKGROUND

1. Technical Field

The present invention relates to an image information converting apparatus, an image forming apparatus, an image information converting system, a non-transitory computer readable medium storing an image information converting program and an image information converting method.

2. Related Art

A dedicated image forming apparatus may be used for forming a large number of images on a paper, such that the multiple images are formed on a continuous paper having perforation lines, and then the continuous paper are cut. Such continuous-paper-dedicated image forming apparatus may directly interpret and process image information that is described in a dedicated language.

In such continuous-paper-dedicated image forming apparatus, an image formation unit mark (unit mark) that represents a boundary may be formed on the perforation lines of the continuous paper for each batch of image forming processes that forms images of multiple pages. According to the unit mark, the cut lines of image formation units are visible on the continuous paper when it is folded in a Z-like shape and piled.

On the other hand, in view of the efficiency in terms of work, apparatus and the like, integration of multiple functionalities is required. In addition, a transition from a continuous-paper-dedicated image forming apparatus to an open architecture image forming apparatus is also required. However, in this case, the open architecture image forming apparatus is required to be improved so that it can use image information for the continuous-paper-dedicated image forming apparatus. In addition, the image information that is described in a language used in the continuous-paper-dedicated image forming apparatus is required to be re-generated into image information described in a language used in the open architecture. More specifically, a Page Description Language (PDL) converter is required, which converts the image information described in the PDL in the continuous-paper-dedicated image forming apparatus into the image information described in the open architecture language.

The data size of the image information used in the continuous-paper-dedicated image forming apparatus is comparatively small, while the image information described in the PDL (for example, PostScript) used in the open architecture provides high functionality but the data size thereof is large due to complicated language procedures and the like. Thus, it is difficult for the open architecture image forming apparatus to process image information having a specific size or more due to specification restrictions such as a paper type, the size of image information, and the image formation area.

The image information used in the continuous-paper-dedicated image forming apparatus may be converted into the image information used in the open architecture image forming apparatus, such that the image information is split into multiple split image files to each have the size which falls within the specification restrictions.

However, when images are formed on the paper based on the split image files, it may be difficult to recognize the position of the unit mark formed from the split image files.

BACKGROUND

An aspect of the present invention provides an image information converting apparatus including: a converting unit that converts first image information described in a first language into second image information described in a second language, the first language being used in a first image forming apparatus, the second language being used in a second image forming apparatus and different from the first language; a splitting unit that splits the first image information into a plurality of split image files so as to each have a data size satisfying a restriction in image processing performed by the second image forming apparatus; and an adding unit that adds first additional information to each of the split image files, the first additional information indicating whether or not to add an image formation unit mark, the image formation unit mark indicating boundaries between batches of image formation units corresponding to images to be formed on a plurality of pages.

BRIEF DESCRIPTION OF THE DRAWINGS

Exemplary embodiment(s) of the present invention will be described in detail based on the following figures.

FIG. 3 is a schematic diagram illustrating one example of an image forming apparatus information according to the exemplary embodiments.

FIG. 8 is a table illustrating an imposition information name determining method used by the image information converting apparatus according to the exemplary embodiments, the method depending on whether or not an image formation unit mark and a copy mark are added.

DETAILED DESCRIPTION

Hereinafter, an image information converting system according to exemplary embodiments will be described with reference to the appended drawings.

First Exemplary Embodiment

First, an image converting system according to a first exemplary embodiment will be described.

Figure 1:
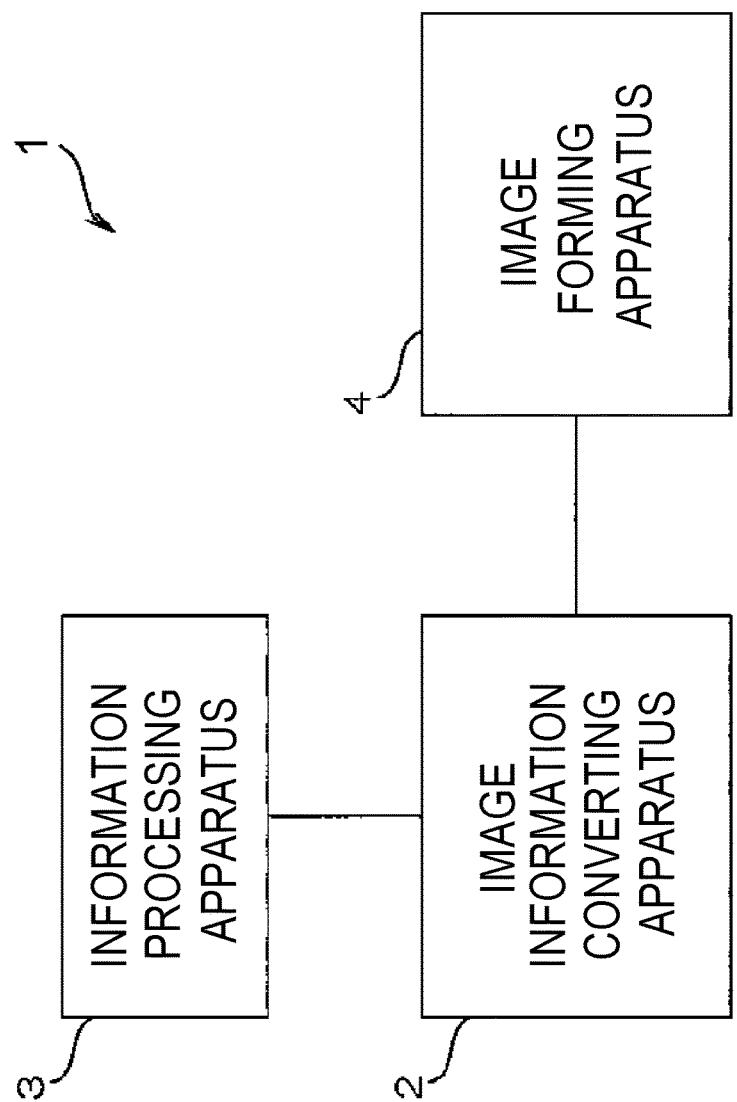
FIG. 1 is a block diagram illustrating an overall configuration of an image information converting system according to exemplary embodiments.

As illustrated in FIG. 1, an image information converting system 1 according to the present exemplary embodiment includes an information processing apparatus 3 that sends image information (dedicated image information). described in a language dedicated for continuous paper. The image information converting system 1 includes an image information converting apparatus 2 that receives and converts the dedicated image information into image information described in an open architecture language (open image information). The image information converting system 1 includes an image forming apparatus 4 that receives the open image information and forms an image on a paper on the basis of the open image information. The image information converting apparatus 2, the information processing apparatus 3, and the image forming apparatus 4 are connected to each other by a communication network.

While the present exemplary embodiment is described in a case where an open architecture image forming apparatus is used as the image forming apparatus 4, the present invention is not limited thereto. The image forming apparatus 4 may be any image forming apparatus provided that the image forming apparatus forms an image on the basis of image information that is described in a language different from the language used in the dedicated image information.

The information processing apparatus 3 in the present exemplary embodiment generates the dedicated image information that is used to form an image using an image forming apparatus dedicated for continuous paper. A unit mark is added to the dedicated image information for each batch of units of image forming processes forming images of multiple pages. The dedicated image information is generated in such a manner that a copy mark (identification mark) used for identifying the content of a page is added to each page. However, since such dedicated image information cannot be processed by the open architecture image forming apparatus 4, the information processing apparatus 3 sends the generated dedicated image information to the image information converting apparatus 2 in the present exemplary embodiment.

The image information converting apparatus 2 converts the received dedicated image information into the open image information that is described in an open architecture language, such as PostScript, processed by the image forming apparatus 4. The image information converting apparatus 2 sends the converted open image information to the image forming apparatus 4. The image forming apparatus 4 receives the open image information from the image information converting apparatus 2 and forms an image on a paper on the basis of the received open image information.

The image information converting apparatus 2 that converts the dedicated image information into the open image information will be described in detail.

Figure 2:
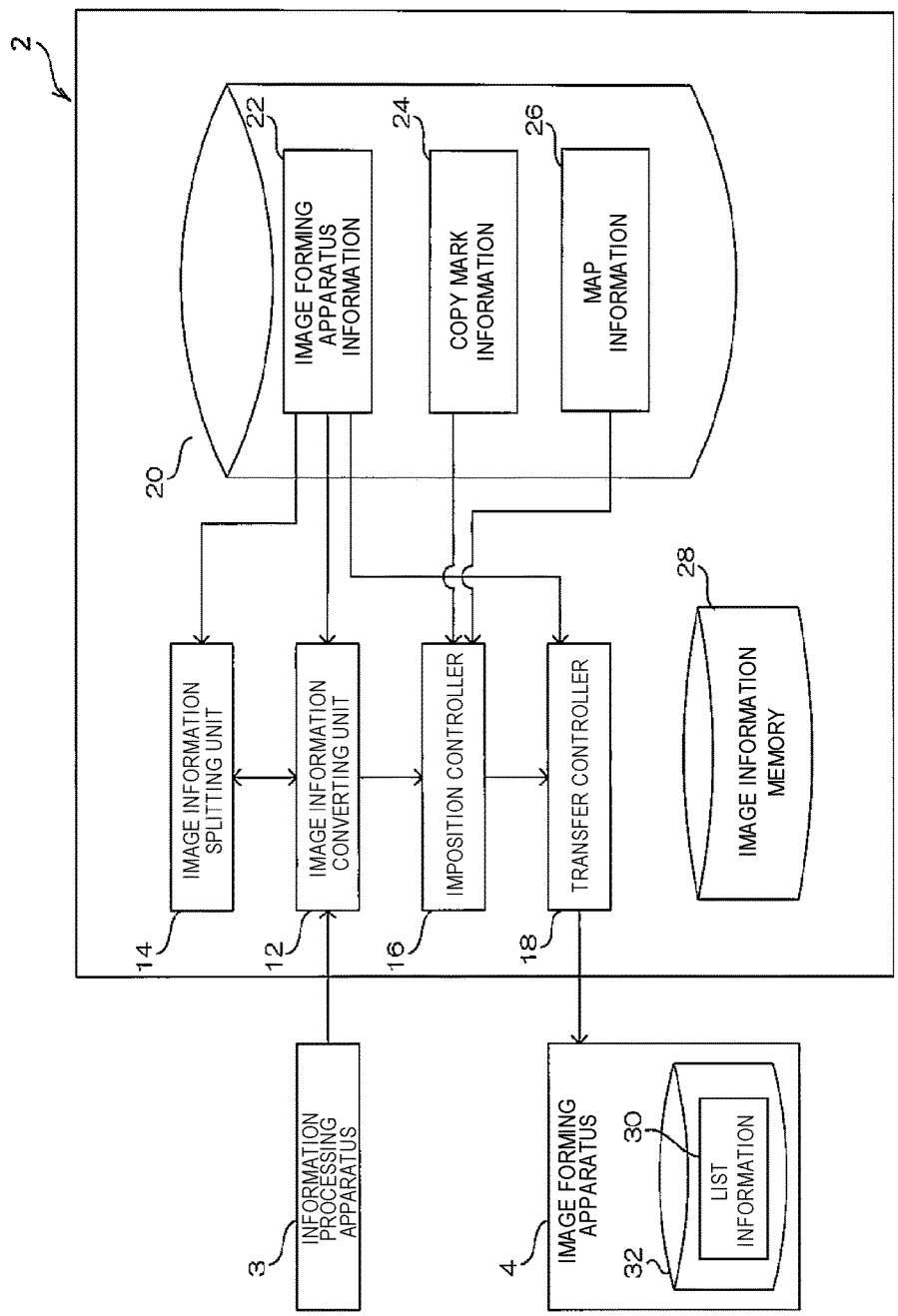
FIG. 2 is a block diagram illustrating a functional configuration of an image information converting apparatus according to the exemplary embodiments.

As illustrated in FIG. 2, the image information converting apparatus 2 includes an image information converting unit 12 that is one example of a converting unit, an image information splitting unit 14 that is one example of a splitting unit, an imposition controller 16 that is one example of an adding unit, a transfer controller 18, a conversion information memory 20, and an image information memory 28. The conversion information memory 20 stores image forming apparatus information 22, copy mark information 24, and map information 26. A list information memory 32 that stores list information 30 including a list of imposition setting information is provided in the image forming apparatus 4.

As illustratively illustrated in FIG. 3, the image forming apparatus information 22 is information in which specifications including a data size restriction, a processable target language, a paper type, a paper size restriction, the number of impositions, a cutting position, and the like are associated with each image forming apparatus connected to the image information converting apparatus 2. The image information splitting unit 14 splits the open image information into multiple split image files on the basis of the specifications of the image forming apparatus 4.

The copy mark information 24 is information that includes a position, the shape, and the like of one or multiple copy marks to be drawn, and is stored in each image forming apparatus. The imposition controller 16 references the copy mark information 24 in the present exemplary embodiment and thereby adds to each of the split image files imposition information that includes whether or not to add a copy mark, which copy mark is to be added, and the like.

Two types of copy marks, for example, "COPY1" and "COPY2", are assumed to be used in the image forming apparatus 4. In this case, "COPY1" and "COPY2" are alternately switched and added like "COPY1"→"COPY2"→"COPY1"→"COPY2"→ . . . in the image forming apparatus 4 in a case where copy marks are added to the images based on the split image files. The copy mark "COPY1" is a mark illustrated by one line, and the copy mark "COPY2" is a mark illustrated by two lines in the present exemplary embodiment (refer to FIG. 12).

Copy marks are generally switched in units of reports. A report is a unit smaller than and included in the image formation unit. Logical boundaries are illustrated with copy marks by reading the split image files in units of reports in a case where the dedicated image information is converted into the open image information, even if the dedicated image information does not have a concept of a report. Image forming apparatuses 4A and 4B independently control copy marks in a case where the multiple image forming apparatuses 4A and 4B perform image formation in parallel with each other.

Figure 4:
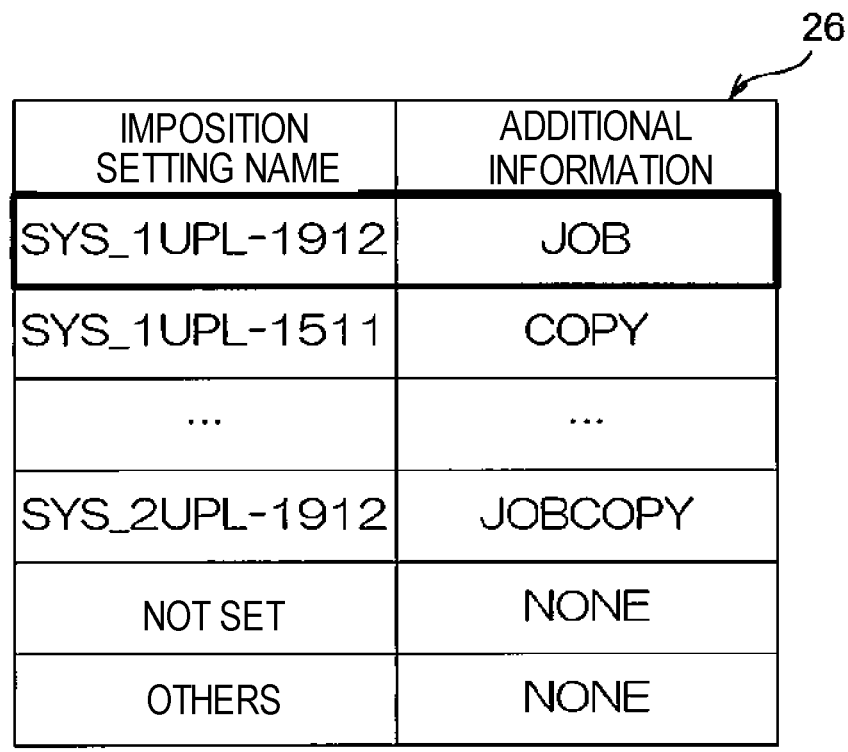
FIG. 4 is a table illustrating one example of map information according to the exemplary embodiments.

As illustratively illustrated in FIG. 4, the map information 26 is information in which an imposition setting name that is used for identification of the imposition setting information used at the time of an imposition process is associated with additional information that indicates types of marks added to each page at the time of the imposition process. The additional information in the present exemplary embodiment is described as "JOB" in a case where only the unit mark is added to each page. The additional information is described as "COPY" in a case where only the copy mark is added to each page. The additional information is described as "JOBCOPY" in a case where the unit mark and the copy mark are added to each page. The additional information is described as "NONE" in a case where neither of the unit mark and the copy mark is added to each page.

The additional information "JOB" is associated with the imposition setting name "SYS_1UPL-1912", and the additional information "COPY" is associated with the imposition setting name "SYS_1UPL-1511" in the example illustrated in FIG. 4. In this case, only the unit mark is added in a case where an imposition process is performed on the basis of the imposition setting information "SYS_1UPL-1912", and only the copy mark is added in a case where an imposition process is performed on the basis of the imposition setting information "SYS_1UPL-1511". The additional information "NONE" is associated in a case where the imposition setting name is "not set". The additional information "NONE" is associated in a case where the imposition setting name is not included in the map information 26, that is, in a case where the imposition setting name is "others".

Figure 5:
FIG. 5 is a schematic diagram illustrating one example of list information according to the exemplary embodiments.

As illustratively illustrated in FIG. 5, the list information 30 is information in which the additional information, the width of an imposition, the length of an imposition, the number of impositions that indicates the number of images printed on one page, single-sided/double-sided printing, and the like are associated with the imposition setting name. The number of impositions in the present exemplary embodiment is described as "1UP" in a case where one image is formed on one page. The number of impositions is described as "2UP" in a case where two images are formed on one page. The single-sided/double-sided printing in the present exemplary embodiment is described as "SIMP" in a case where images are formed on a single side of a paper. The single-sided/double-sided printing is described as "DOUB" in a case where images are formed on both sides of a paper.

Figure 6:
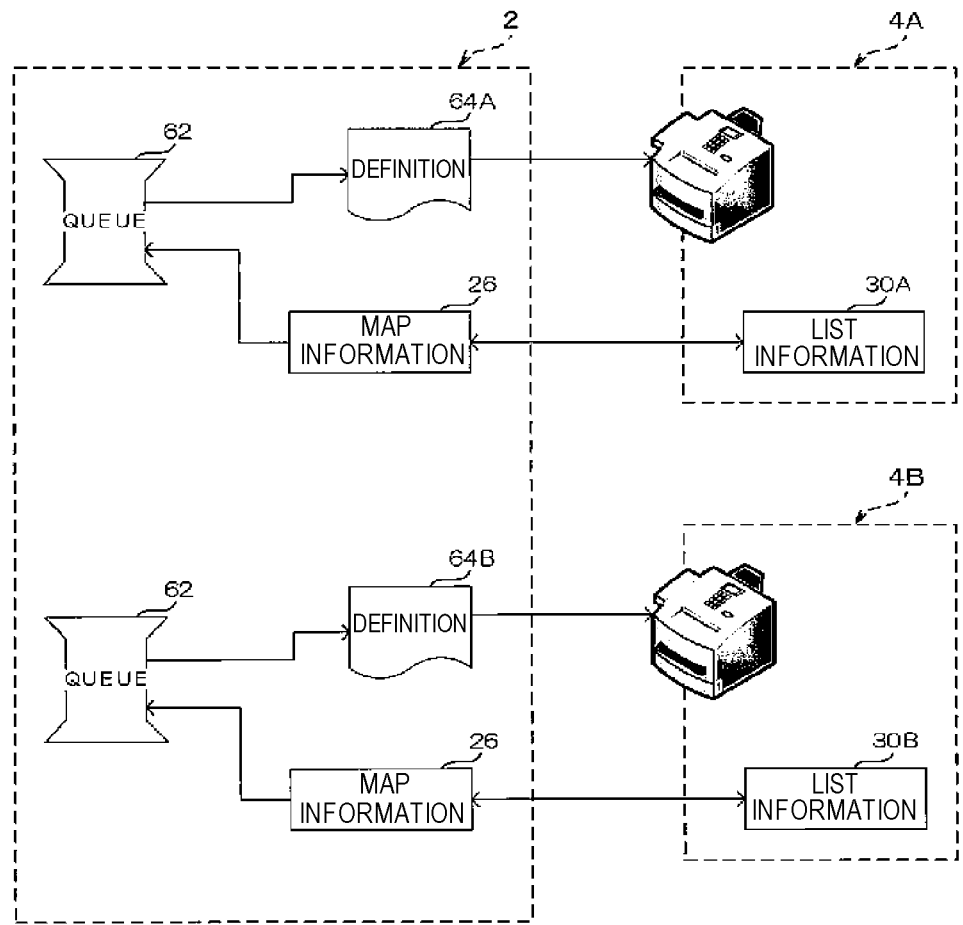
FIG. 6 is a schematic diagram illustrating a relationship between the image information converting apparatus and an image forming apparatus according to the exemplary embodiments.

As illustratively illustrated in FIG. 6, definitions (network address, user name/password for connection, printer queue name, and the like) 64A and 64B of the multiple image forming apparatuses 4A and 4B are statically associated with a queue 62 which is a wait list in the image information converting apparatus 2. The map information 26 stored in the image information converting apparatus 2 is associated with list information 30A and 30B stored in the image forming apparatus 4.

Specifically, each imposition setting information has the same content in a case where the imposition setting name included in the map information 26 of the image information converting apparatus 2 is the same as the imposition setting name included in the list information 30A of the image forming apparatus 4A or the list information 30B of the image forming apparatus 4B. The imposition setting names of the list information 30A and 30B of the image forming apparatus 4 include an imposition setting name that is not suffixed with "_N" and an imposition setting name that is suffixed with "_N". The imposition setting name suffixed with "_N" is the same as the imposition setting name not suffixed with "_N" except that the unit mark is not set to be added for the imposition setting name suffixed with "_N" in the additional information. Similarly, the imposition setting names of the list information 30A and 30B of the image forming apparatus 4 include an imposition setting name that is not suffixed with "1" or "2" and an imposition setting name that is suffixed with "1" or "2". The imposition setting name suffixed with "1" or "2" is the same as the imposition setting name not suffixed with "1" or "2" except that the copy mark ("COPY1" or "COPY2") is set to be added for the imposition setting name suffixed with "1" or "2" in the additional information.

Figure 7:
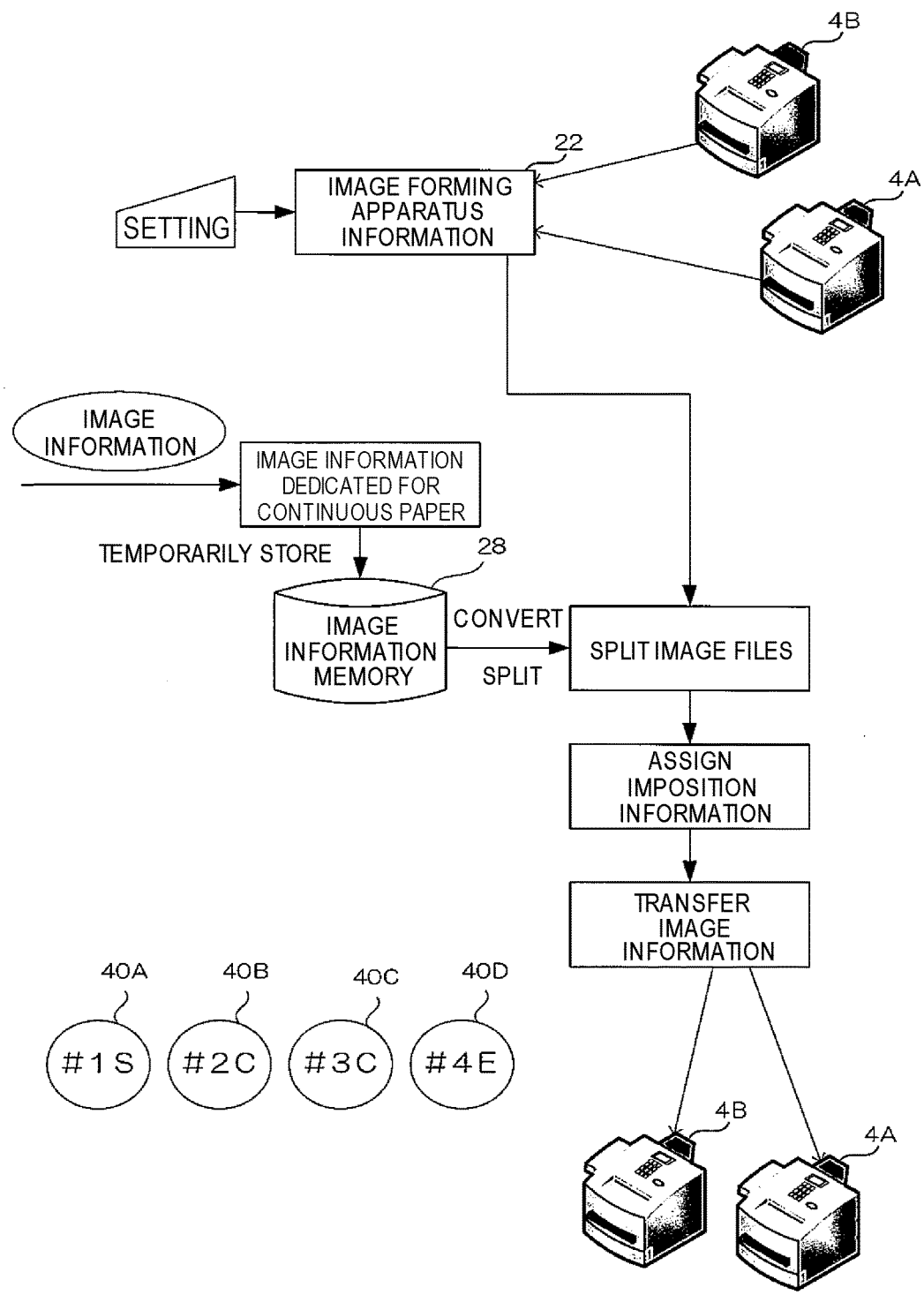
FIG. 7 is a schematic diagram illustrating the flow of an image information converting method used by the image information converting apparatus according to the exemplary embodiments.

As illustratively illustrated in FIG. 7, the image information converting apparatus 2 obtains from the image forming apparatuses 4A and 4B specification information that indicates the specifications of each image forming apparatus, and manages the image forming apparatuses 4A and 4B using the image forming apparatus information 22 on the basis of the obtained specification information. While the image information converting apparatus 2 dynamically obtains the specification information from the image forming apparatuses 4A and 4B and automatically sets the specification information of the image forming apparatuses 4A and 4B in the present exemplary embodiment, the present invention is not limited thereto. For example, a user may manually set the specification information of the image forming apparatuses 4A and 4B in the image forming apparatus information 22.

The image information converting unit 12 receives the dedicated image information from the information processing apparatus 3 using any manner such as a network (LPR/FTP) and HotFolder and temporarily stores (spools) the received dedicated image information in the image information memory 28. The image information converting unit 12 converts the temporarily stored dedicated image information into the open image information. At this point, as described above, the data size of the open image information is comparatively larger than the data size of the dedicated image information in a case where the dedicated image information is converted into the open image information. Thus, the image information splitting unit 14 splits the open image information into multiple split image files.

The image information splitting unit 14 obtains from the image forming apparatus information 22 a size restriction corresponding to the image forming apparatus 4 that forms an image indicated by the open image information (for example, a processable PostScript size restriction). The image information splitting unit 14 splits the open image information into physically appropriate bounded parts of the open image information in order to satisfy the obtained size restriction and creates multiple split image files. For example, the size of the converted open image information may be 3 GB in a case where the dedicated image information of 500 MB is converted into the open image information. In such a case, the open image information is split into multiple split image files to each have a data size of 1 GB or less in a case where only the open image information having the data size of 1 GB or less can be processed due to the size restriction of the image forming apparatus 4.

The imposition controller 16 adds to each split image file a file name to which an order is assigned, so that the order of the multiple split image files is in accordance with the order of images in the dedicated image information. The imposition controller 16 adds to each split image file a file name that allows identification that the split image files are created from the same dedicated image information.

Assume that, for example, one dedicated image information is split into four pieces to create four split image files. In this case, the file names "TEST-JOB_0001S.ps", "TEST-JOB_0002C.ps", "TEST-JOB_0003C.ps", and "TEST-JOB_0004E.ps" are respectively added to the split image files. The name "TEST-JOB" in these file names is an identification name that indicates the dedicated image information. The name "0001S" means the first file (START), the names "0002C" and "0003C" mean the second and third files (CONTINUE), and the name "0004E" means the fourth file (END).

The imposition controller 16 adds, to the imposition information of each split image file, information (first additional information) that indicates whether or not to add the unit mark, when each image based on the split image files is formed on a paper by the image forming apparatus 4. The imposition controller 16 adds, to the imposition information of each split image file, information (second additional information) that indicates whether or not to add the copy mark, when each image based on the split image files is formed on a paper by the image forming apparatus 4. The imposition information includes some imposition setting information, the information specified by the imposition setting name, included in the list information 30 of the image forming apparatus 4. The imposition information in the present exemplary embodiment includes information that specifies the imposition setting name of the dedicated image information to which "N" is added, in a case where the unit mark is not added. The imposition information includes information that specifies the imposition setting name of the dedicated image information to which the identification name of the copy mark is added, in a case where the copy mark is added.

Specifically, assume that the imposition setting name of the dedicated image information is "AAA" as illustratively illustrated in FIG. 8. In this case, the identification name "1" of "COPY1" is added to the imposition setting name to form the imposition setting name "AAA_1" in a case where the copy mark "COPY1" is added and where the unit mark is output. The identification name "1" of "COPY1" and the identification name "N" that does not identify the unit mark are added to the imposition setting name to form the imposition setting name "AAA_1N" in a case where the copy mark "COPY1" is added and where the unit mark is not output. The identification name "2" of "COPY2" is added to the imposition setting name to form the imposition setting name "AAA_2" in a case where the copy mark "COPY2" is added and where the unit mark is output. The identification name "2" of "COPY2" and the identification name "N" that does not identify the unit mark are added to the imposition setting name to form the imposition setting name "AAA_2N" in a case where the copy mark "COPY2" is added and where the unit mark is not output.

The transfer controller 18 transfers to the image forming apparatus 4 the multiple split image files to which the imposition information is added. At this point, the data of the multiple split image files is sent to the image forming apparatus 4 in accordance with the order assigned to the file names. The order of sending is split image file 40A of "0001S"→split image file 40B of "0002C"→split image file 40C of "0003C"→split image file 40D of "0004E" in the above example in which four split image files are created.

Next, an imposition process in which the image forming apparatus 4 that receives multiple split image files performs imposition on the basis of the imposition information added to the split image files will be described. The following cases (A) to (C) are considered when images are imposed on the basis of the split image files.

(A) Add only the unit mark.
(B) Add only the copy mark.
(C) Add the unit mark and the copy mark.

Figure 9:
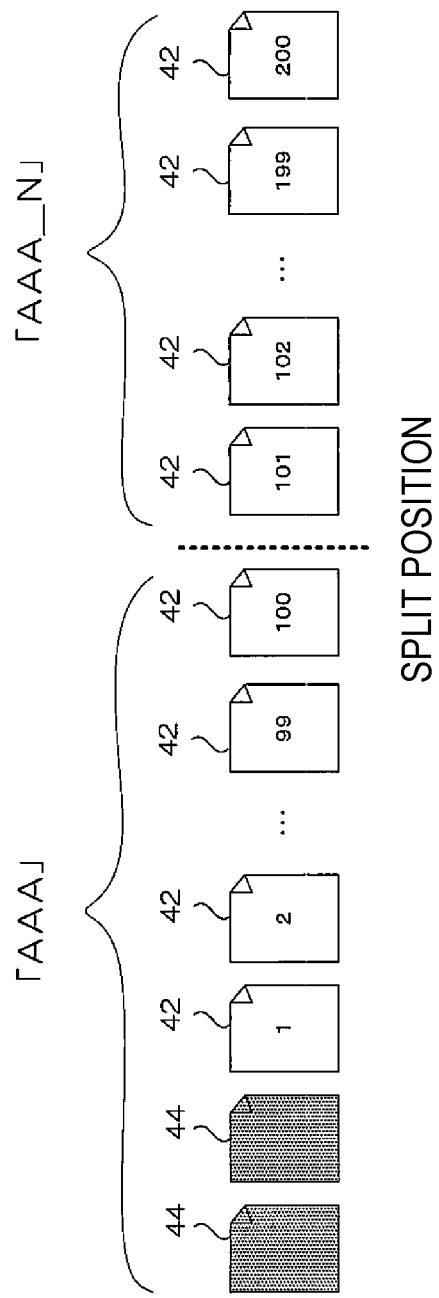
FIG. 9 is a table illustrating a mark adding method used by the image information converting apparatus according to the exemplary embodiments in a case where only the image formation unit mark is added.

Assume that in the case (A), the imposition setting name "AAA" is set for the first image formation unit and that the imposition setting name "AAA_N" is set for the subsequent image formation units when images based on the split image files are formed on a paper. In this case, as illustratively illustrated in FIG. 9, a white paper image 44 to which the unit mark is added is added to the place immediately before an image 42 for which the imposition setting name "AAA" is set, and the white paper image 44 is not added to the place immediately before the image 42 for which the imposition setting name "AAA_N" is set.

Figure 10:
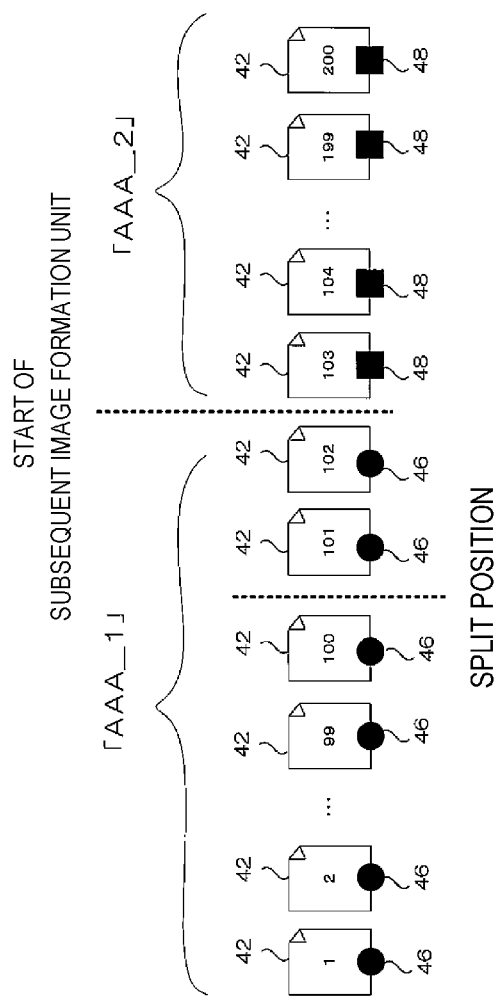
FIG. 10 is a table illustrating a mark adding method used by the image information converting apparatus according to the exemplary embodiments in a case where only the copy mark is added.

Assume that in the case (B), the imposition setting name "AAA_1" is set for the first image formation unit and that the imposition setting name "AAA_2" is set for the subsequent image formation units when images based on the split image files are formed on a paper. In this case, as illustratively illustrated in FIG. 10, a copy mark 46 is added to the image 42 for which the imposition setting name "AAA_1" is set, and a copy mark 48 is added to the image 42 for which the imposition setting name "AAA_2" is set. The copy mark "COPY1" and the copy mark "COPY2" are alternately added for each image formation unit. That is, the same copy mark is added in a case where one image formation unit is split into multiple split image files.

Figure 11:
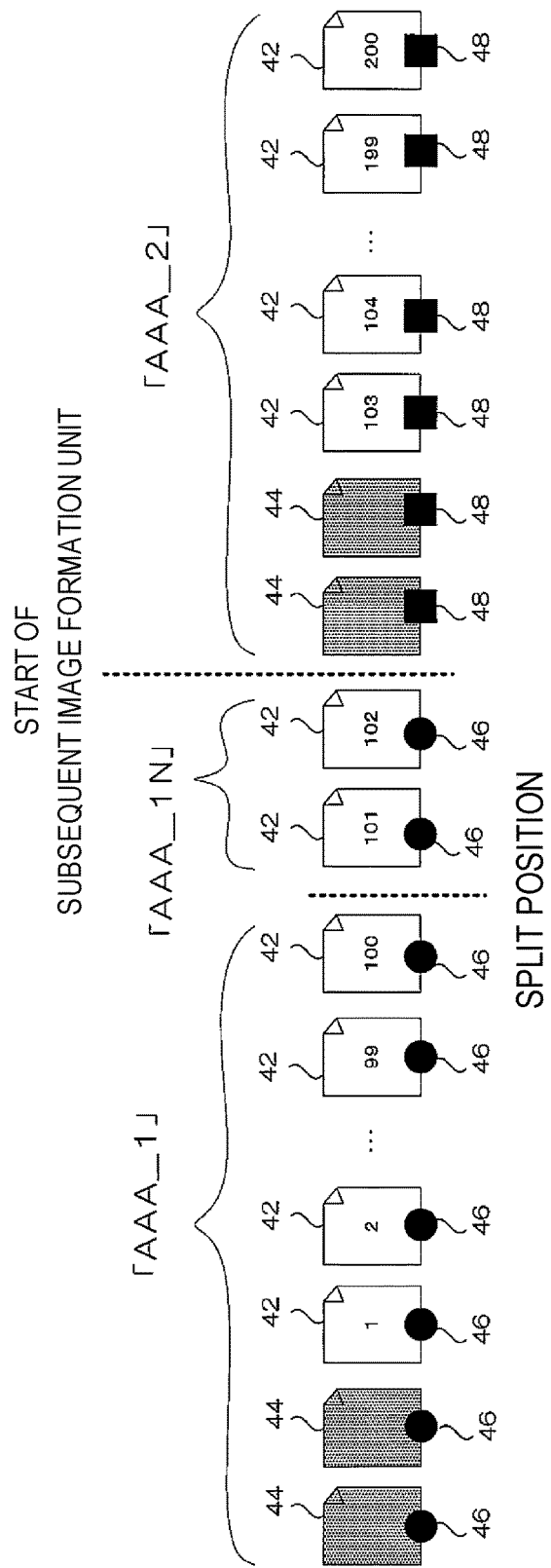
FIG. 11 is a table illustrating a mark adding method used by the image information converting apparatus according to the exemplary embodiments in a case where the image formation unit mark and the copy mark are added.

Assume that in the case (C), the imposition setting name "AAA_1" is set for the first split image file group in the first image formation unit and that the imposition setting name "AAA_1N" is set for the subsequent split image file groups in the first image formation unit when images based on the split image files are formed on a paper. The imposition setting name "AAA_2" is assumed to be set for the subsequent image formation units. In this case, as illustratively illustrated in FIG. 11, the white paper image 44 to which the unit mark is added is added to the place immediately before the image 42 for which the imposition setting name "AAA_1" is set, and the copy mark 46 is added to the image 42. The white paper image 44 is not added to the place immediately before the image 42 for which the imposition setting name "AAA_1N" is set, and the copy mark 46 is added to the image 42. The white paper image 44 to which the unit mark is added is added to the place immediately before the image 42 for which the imposition setting name "AAA_2" is set, and the copy mark 48 is added to the image 42. The copy mark 46 of "COPY1" and the copy mark 48 of "COPY2" are alternately added for each report. That is, the same copy mark 46 or 48 is added in a case where one report is split into multiple split image files.

Figure 12:
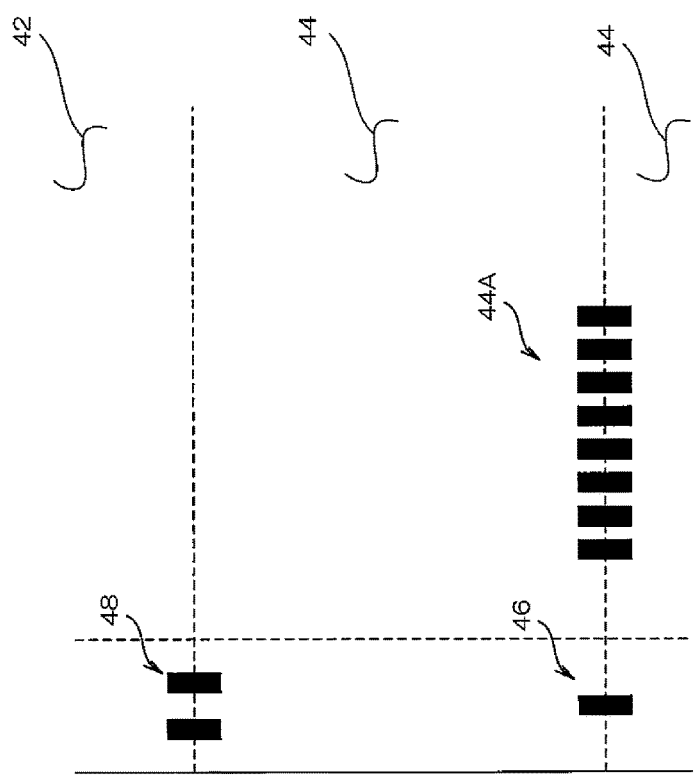
FIG. 12 is a schematic diagram illustrating one example of a paper to which the image formation unit mark is added by the image information converting apparatus according to the exemplary embodiments.
Figure 13:
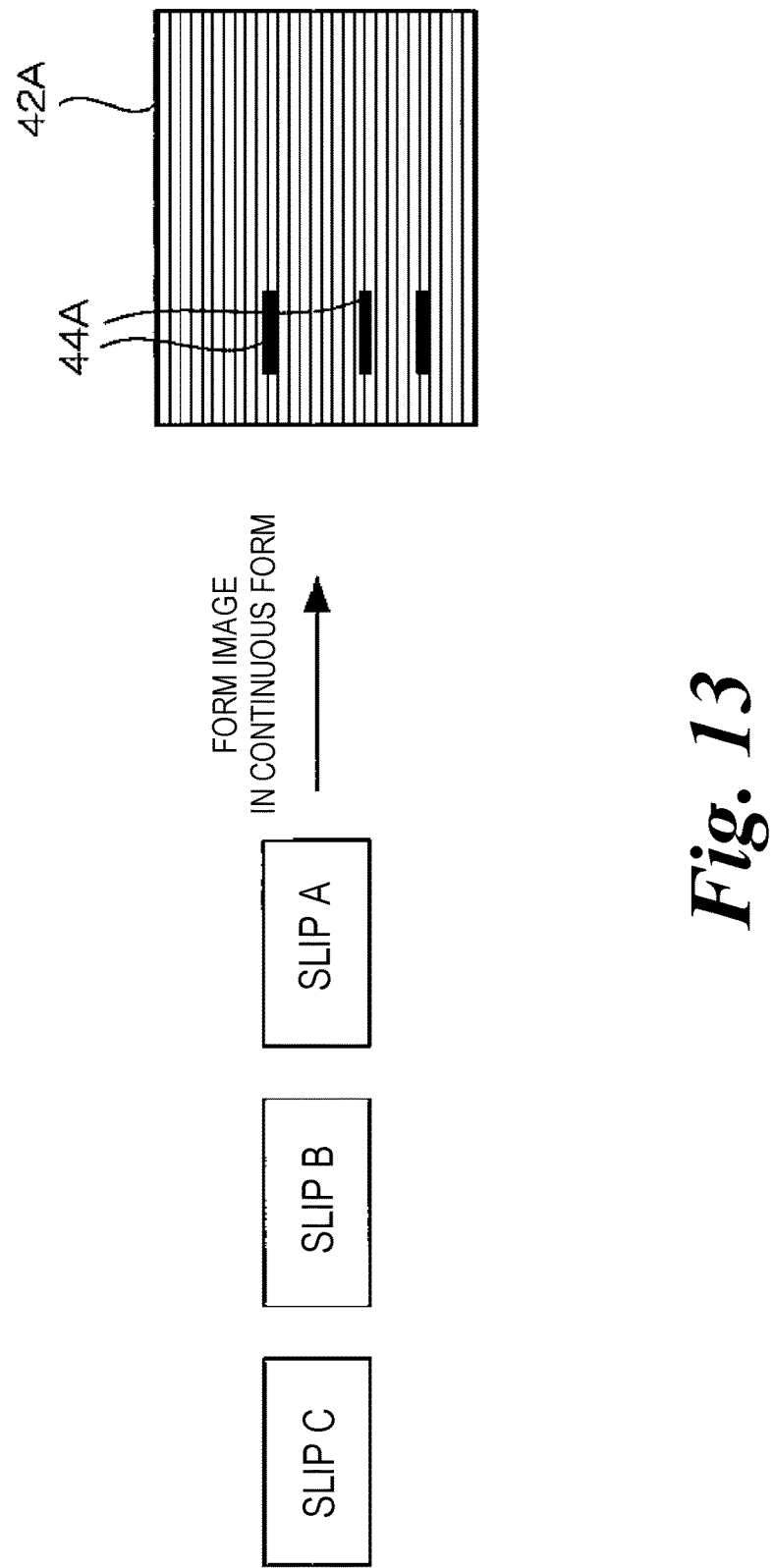
FIG. 13 is a schematic diagram illustrating one example of a paper to which the unit mark is added, in a case where images of slips are formed in a continuous form in the image information converting system according to the exemplary embodiments.

As illustratively illustrated in FIG. 12, a unit mark 44A is formed into multiple lines to straddle the white paper image 44, the copy mark 46 is formed into one line, and the copy mark 48 is formed into two lines in the present exemplary embodiment. Accordingly, as illustratively illustrated in FIG. 13, assume that a slip A, a slip B, and a slip C are respectively set as image formation units and that the image formation units with the unit mark 44A added thereto are formed in a continuous form. The unit mark 44A is visible on a side of a paper 42A that is obtained by Z-folding and piling the continuous paper on which images are formed, and the unit mark 44A allows the user to identify the image formation unit.

Figure 14:
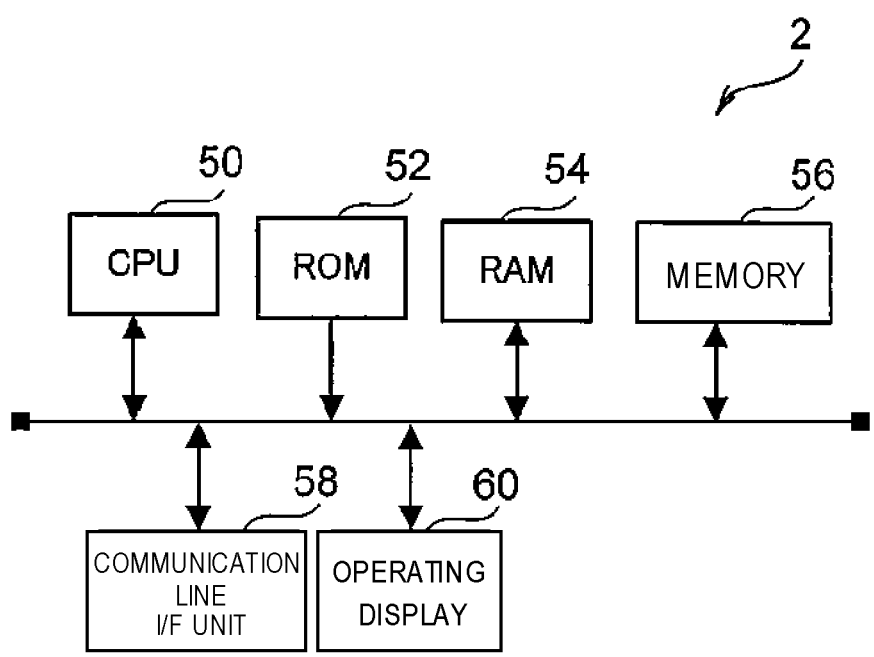
FIG. 14 is a block diagram illustrating an electrical configuration of the image information converting apparatus according to the exemplary embodiments.

As illustrated in FIG. 14, the image information converting apparatus 2 according to the present exemplary embodiment includes a central processing unit (CPU) that performs general control of the apparatus, and each unit of the image information converting apparatus 2 is realized under control of a CPU 50. The CPU 50 is connected to a read-only memory (ROM) 52 that stores programs and various types of information used in processing by the CPU 50. The CPU 50 is connected to a random access memory (RAM) 54 that, as a work area of the CPU 50, temporarily stores various types of data and to a memory 56 such as a non-volatile memory that stores various types of information used in processing by the CPU 50. The conversion information memory 20 is provided in the memory 56, and the image information memory 28 is provided in the RAM 54.

The CPU 50 is connected to a communication line interface (I/F) unit 58 that inputs and outputs data to an external apparatus connected to the image information converting apparatus 2. The information processing apparatus 3 and the image forming apparatus 4 described above are connected to the communication line I/F unit 58. The CPU 50 is connected to an operating display 60 that includes a keyboard, a mouse, and the like for input of data and a display and the like for display of data.

Figure 15:
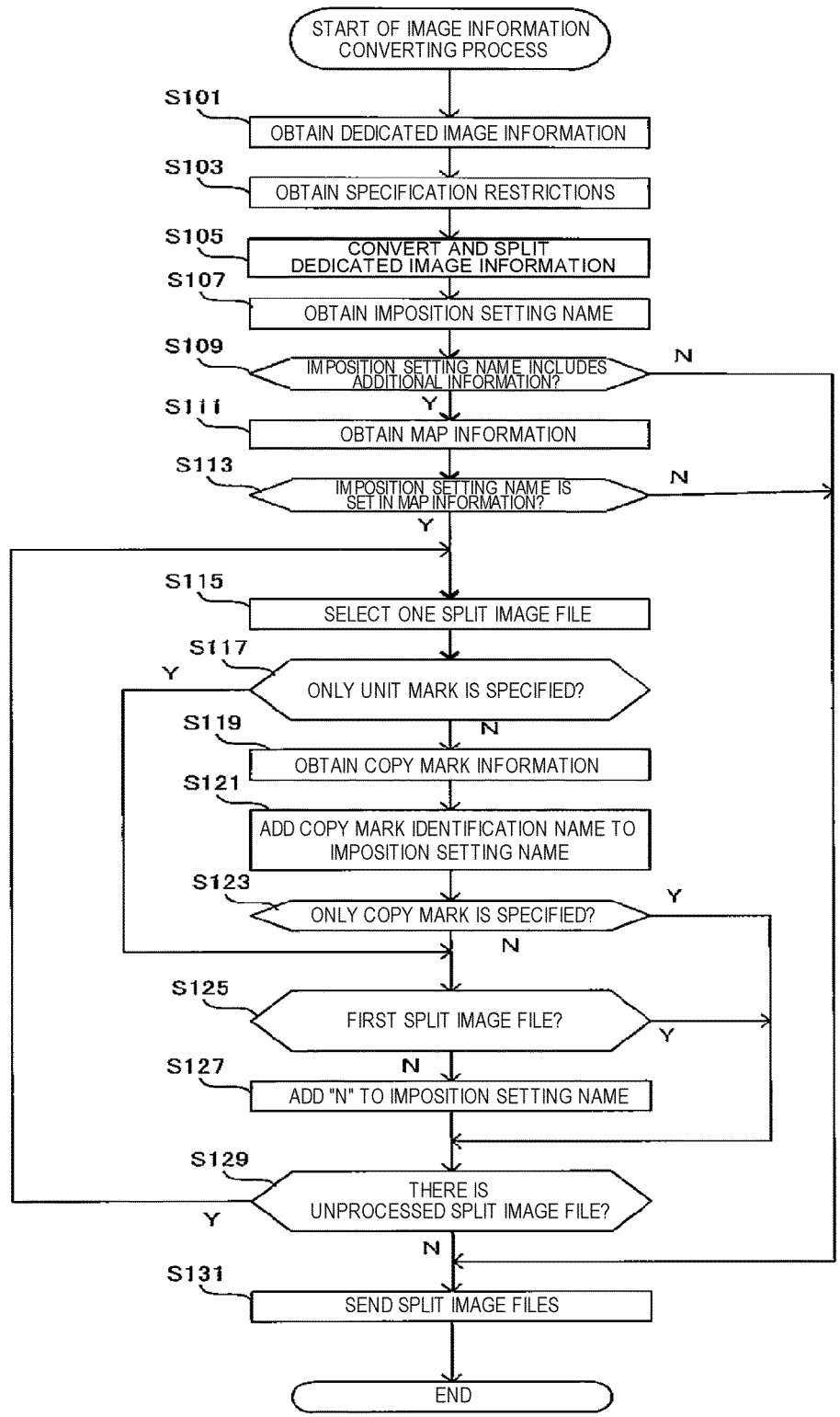
FIG. 15 is a flowchart illustrating the flow of a program for an image information converting process according to a first exemplary embodiment.

Next, a process flow when the image information converting apparatus 2 according to the present exemplary embodiment performs an image information converting process will be described with reference to the flowchart illustrated in FIG. 15.

While a program for an image information converting process is stored in advance in the memory 56 in the present exemplary embodiment, the present invention is not limited thereto. For example, a program for an image forming process may be received from the external apparatus through the communication line I/F unit 58 and executed. The program for an image information converting process may be recorded on a recording medium such as a CD-ROM and read by using a CD-ROM drive to perform an image forming process.

The program for an image information converting process in the present exemplary embodiment is executed in a case where the user inputs an execution instruction by operating the operating display 60. However, the execution timing is not limited thereto. For example, the program may be executed at a timing when the image information converting apparatus 2 receives the dedicated image information.

In Step S101, the image information converting unit 12 obtains the dedicated image information from the information processing apparatus 3.

In Step S103, the image information converting unit 12 obtains from the image forming apparatus information 22 specification restrictions of the image forming apparatus 4 that forms images on the basis of the obtained dedicated image information.

In Step S105, the image information converting unit 12 converts the dedicated image information into the open image information, and the image information splitting unit 14 splits the open image information into multiple split image files on the basis of the specification restrictions of the image forming apparatus 4.

In Step S107, the imposition controller 16 obtains the imposition setting name of the obtained dedicated image information.

In Step S109, the imposition controller 16 determines whether or not the additional information related to the unit mark and the copy mark is included in the imposition information of the obtained dedicated image information. A transition is made to Step S111 in a case where the additional information is determined to be included in Step S109 (Y in S109). A transition is made to Step S131 in a case where the additional information is determined not to be included in Step S109 (N in S109).

In Step S111, the imposition controller 16 obtains the map information 26.

In Step S113, the imposition controller 16 determines whether or not the imposition setting name of the obtained dedicated image information is set in the map information 26. A transition is made to Step S115 in a case where the imposition setting name is determined to be set in the map information 26 in Step S113 (Y in S113). A transition is made to Step S131 in a case where the imposition setting name is determined not to be set in the map information 26 in Step S113 (N in S113).

In Step S115, the imposition controller 16 selects one split image file from the split image files that are split in Step S105.

In Step S117, the imposition controller 16 determines whether or not the additional information that is associated in the map information 26 with the imposition setting name of the obtained dedicated image information specifies only the unit mark, that is, whether or not the additional information is "JOB". A transition is made to Step S125 in a case where the additional information is determined to specify only the unit mark in Step S117 (Y in S117). A transition is made to Step S119 in a case where the additional information is determined not to specify only the unit mark in Step S117 (N in S117).

In Step S119, the imposition controller 16 obtains the copy mark information 24 corresponding to the image forming apparatus 4 that forms images on the basis of the obtained dedicated image information.

In Step S121, the imposition controller 16 adds to the selected split image file the imposition information that includes the imposition setting name obtained by adding the copy mark identification name to the imposition setting name of the obtained dedicated image information.

In Step S123, the imposition controller 16 determines whether or not the additional information that is associated in the map information 26 with the imposition setting name of the obtained dedicated image information specifies only the copy mark, that is, whether or not the additional information is "COPY". A transition is made to Step S129 in a case where the additional information is determined to specify only the copy mark in Step S123 (Y in S123). A transition is made to Step S125 in a case where the additional information is determined not to specify only the copy mark in Step S123 (N in S123).

In Step S125, the imposition controller 16 determines whether or not the selected split image file is the first split image file of the image formation unit. A transition is made to Step S129 in a case where the selected split image file is determined to be the first split image file of the image formation unit in Step S125 (Y in S125). A transition is made to Step S127 in a case where the selected split image file is determined not to be the first split image file of the image formation unit in Step S125 (N in S125).

In Step S127, the imposition controller 16 adds to the selected split image file the imposition information that includes the imposition setting name obtained by adding "N" to the imposition setting name of the obtained dedicated image information. The imposition controller 16, in a case where the copy mark identification name is previously added to the imposition setting name of the obtained dedicated image information, adds to the selected split image file the imposition information that includes the imposition setting name obtained by adding "N" to the imposition setting name to which the copy mark identification name is previously added.

In Step S129, the imposition controller 16 determines whether or not there is a split image file to be processed, that is, a split image file for which the processes of Step S115 to Step S127 are not performed. A transition is made to Step S115 in a case where a split image file to be processed is determined to exist in Step S129 (Y in S129). A transition is made to Step S131 in a case where a split image file to be processed is determined not to exist in Step S129 (N in S129).

In Step S131, the transfer controller 18 sends the split image files to the image forming apparatus 4 and ends the execution of the program for the present image information converting process.

The dedicated image information (first image information) that is described in a first language used in the image forming apparatus dedicated for continuous paper (first image forming apparatus) is converted in the present exemplary embodiment into the open image information (second image information) that is described in a second language used in the image forming apparatus 4 (second image forming apparatus). The open image information in the present exemplary embodiment is split into multiple split image files so that the data size thereof satisfies the restriction in image formation performed by the image forming apparatus 4. The imposition information to which information indicating whether or not to form the image formation unit mark (first additional information) is added is added to each split image file in the present exemplary embodiment. Accordingly, the image formation unit mark being added to an erroneous position is avoided when the image information used in the image forming apparatus dedicated for continuous paper is converted into the image information used in the open architecture.

Second Exemplary Embodiment

Next, an image information converting apparatus according to a second exemplary embodiment will be described.

The first exemplary embodiment is described in a case where the image information converting apparatus 2 determines whether or not to add the unit mark and the copy mark to each image based on the split image files. Meanwhile, the second exemplary embodiment will be described in a case where the image forming apparatus 4 determines whether or not to add the unit mark and the copy mark to each image based on the split image files.

A configuration of the image information converting system according to the second exemplary embodiment is the same as that of the image information converting system 1 according to the first exemplary embodiment, and thus each configuration will not be described.

Figure 16:
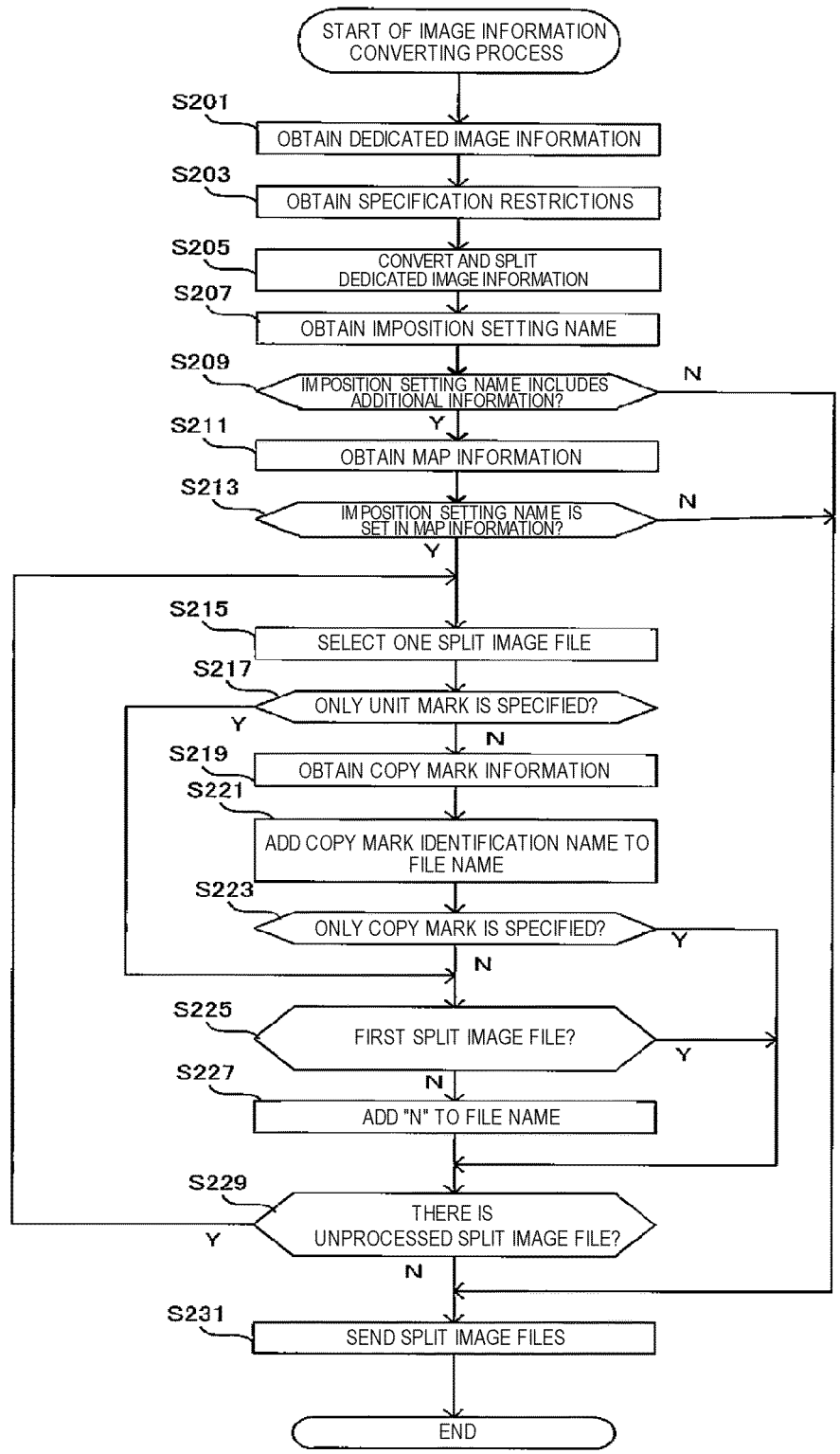
FIG. 16 is a flowchart illustrating the flow of a program for an image information converting process according to a second exemplary embodiment.

Next, a process flow when the image information converting apparatus 2 according to the present exemplary embodiment performs an image information converting process will be described with reference to the flowchart illustrated in FIG. 16.

While a program for an image information converting process is stored in advance in the memory 56 in the present exemplary embodiment, the present invention is not limited thereto. For example, the program for an image information converting process may be recorded on a recording medium such as a CD-ROM and read to perform an image forming process using the program for an image forming process. Alternatively, the program for an image information converting process may be recorded on a recording medium such as an external semiconductor memory and read to perform an image forming process using the program for an image forming process.

The program for an image information converting process in the present exemplary embodiment is executed in a case where the user inputs an execution instruction by operating the operating display 60. However, the execution timing is not limited thereto. For example, the program may be executed at a timing when the image information converting apparatus 2 receives the dedicated image information.

In Step S201, the image information converting unit 12 obtains the dedicated image information from the information processing apparatus 3.

In Step S203, the image information converting unit 12 obtains from the image forming apparatus information 22 specification restrictions of the image forming apparatus 4 that forms images on the basis of the obtained dedicated image information.

In Step S205, the image information converting unit 12 converts the dedicated image information into the open image information, and the image information splitting unit 14 splits the open image information into multiple split image files on the basis of the specification restrictions of the image forming apparatus 4.

In Step S207, the imposition controller 16 obtains the imposition setting name of the obtained dedicated image information.

In Step S209, the imposition controller 16 determines whether or not the additional information related to the unit mark and the copy mark is included in the imposition information of the obtained dedicated image information. A transition is made to Step S211 in a case where the additional information is determined to be included in Step S209 (Y in S209). A transition is made to Step S231 in a case where the additional information is determined not to be included in Step S209 (N in S209).

In Step S211, the imposition controller 16 obtains the map information 26.

In Step S213, the imposition controller 16 determines whether or not the imposition setting name of the obtained dedicated image information is set in the map information 26. A transition is made to Step S215 in a case where the imposition setting name is determined to be set in the map information 26 in Step S213 (Y in S213). A transition is made to Step S231 in a case where the imposition setting name is determined not to be set in the map information 26 in Step S213 (N in S213).

In Step S215, the imposition controller 16 selects one split image file from the split image files that are split in Step S205.

In Step S217, the imposition controller 16 determines whether or not the additional information that is associated in the map information 26 with the imposition setting name of the obtained dedicated image information specifies only the unit mark, that is, whether or not the additional information is "JOB". A transition is made to Step S225 in a case where the additional information is determined to specify only the unit mark in Step S217 (Y in S217). A transition is made to Step S219 in a case where the additional information is determined not to specify only the unit mark in Step S217 (N in S217).

In Step S219, the imposition controller 16 obtains the copy mark information 24 corresponding to the image forming apparatus 4 that forms images on the basis of the obtained dedicated image information.

In Step S221, the imposition controller 16 adds the copy mark identification name to the file name of the selected split image file.

In Step S223, the imposition controller 16 determines whether or not the additional information that is associated in the map information 26 with the imposition setting name of the obtained dedicated image information specifies only the copy mark, that is, whether or not the additional information is "COPY". A transition is made to Step S229 in a case where the additional information is determined to specify only the copy mark in Step S223 (Y in S223). A transition is made to Step S225 in a case where the additional information is determined not to specify only the copy mark in Step S223 (N in S223).

In Step S225, the imposition controller 16 determines whether or not the selected split image file is the first split image file of the image formation unit. A transition is made to Step S229 in a case where the selected split image file is determined to be the first split image file of the image formation unit in Step S225 (Y in S225). A transition is made to Step S227 in a case where the selected split image file is determined not to be the first split image file of the image formation unit in Step S225 (N in S225).

In Step S227, the imposition controller 16 adds "N" to the file name of the selected split image file.

In Step S229, the imposition controller 16 determines whether or not there is a split image file to be processed, that is, a split image file for which the processes of Step S215 to Step S227 are not performed. A transition is made to Step S215 in a case where a split image file to be processed is determined to exist in Step S229 (Y in S229). A transition is made to Step S231 in a case where a split image file to be processed is determined not to exist in Step S229 (N in S229).

In Step S231, the transfer controller 18 sends the split image files to the image forming apparatus 4 and ends the execution of the program for the present image information converting process.

The image forming apparatus 4, when forming images based on split image files on a paper, performs imposition on the basis of the imposition setting information and, in a case where a copy mark identifier is added to the file name of a split image file, forms the copy mark corresponding to the identifier. The image forming apparatus 4 performs imposition on the basis of the imposition setting information and forms the unit mark in a case where "N" is not added to the file name of a split image file, and does not form the unit mark in a case where "N" is added thereto.

The dedicated image information (first image information) that is described in a first language used in the image forming apparatus dedicated for continuous paper (first image forming apparatus) is converted in the present exemplary embodiment into the open image information (second image information) that is described in a second language used in the image forming apparatus 4 (second image forming apparatus). The open image information in the present exemplary embodiment is split into multiple split image files so that the data size thereof satisfies the restriction in image formation performed by the image forming apparatus 4. The information that indicates whether or not to form the image formation unit mark (first additional information) is added to each split image file in the present exemplary embodiment. Accordingly, the image formation unit mark being assigned to an erroneous position is avoided when the image information used in the image forming apparatus dedicated for continuous paper is converted into the image information used in the open architecture.

While the present exemplary embodiment is described in a case where the image information converting apparatus 2 determines whether or not to add "N" to the file names of each split image file and where "N" is added in accordance with the determination result, the present invention is not limited thereto. For example, as described above, the image information converting apparatus 2 may send the split image files having original file names, such as "TEST-JOB_0001S.ps", "TEST-JOB_0002C.ps", "TEST-JOB_0003C.ps", and "TEST-JOB_0004E.ps", without changing the file names of the split image files. In this case, the image forming apparatus 4 forms the unit mark in an image that is based on a split image file having a file name including information (for example, "0001S") indicating the first image of the image formation unit, and controls image formation in order not to form the unit mark in images that are based on the other split image files.

What is claimed is:

1. An image information converting apparatus comprising:
 a converting unit that converts first image information described in a first language into second image information described in a second language, the first language being used in a first image forming apparatus, the second language being used in a second image forming apparatus and different from the first language;
 a splitting unit that splits the first image information into a plurality of split image files so as to each have a data size satisfying a restriction in image processing performed by the second image forming apparatus; and
 an adding unit that adds first additional information to each of the split image files, the first additional information indicating whether or not to add an image formation unit mark, the image formation unit mark indicating boundaries between batches of image formation units corresponding to images to be formed on a plurality of pages.

2. The image information converting apparatus of claim 1, wherein the adding unit adds the first additional information indicating addition of the image formation unit mark to the split image file corresponding to the first image of the image formation unit.

3. The image information converting apparatus of claim 1, wherein the adding unit adds second additional information to each of the split image files, the second additional information indicating an identification mark to be added to images represented by the split image files.

4. The image information converting apparatus of claim 3, wherein the adding unit adds the first additional information in predetermined units smaller than the image formation unit in the first image information.

5. The image information converting apparatus of claim 3, wherein the adding unit adds the second additional information to an imposition setting name, the imposition setting name identifying imposition setting information at an imposition process.

6. The image information converting apparatus of claim 3, wherein the adding unit adds the second additional information to file names of the split image files.

7. The image information converting apparatus of claim 1, wherein the adding unit adds the first additional information to an imposition setting name, the imposition setting name identifying imposition setting information at an imposition process.

8. The image information converting apparatus of claim 1, wherein the adding unit adds the first additional information to file names of the split image files.

9. An image forming apparatus comprising:
the image information converting apparatus of claim 1; and
a forming unit that forms an image indicated by the second image information described in the second language, the second image information being processed by the image information converting apparatus.

10. An image forming apparatus comprising:
an acquiring unit that acquires a plurality of split image files from an image information converting apparatus, the image information converting apparatus comprising
   a converting unit that converts first image information described in a first language into second image information described in a second language, the first language being used in a first image forming apparatus, the second language being used in a second image forming apparatus and different from the first language,
   a splitting unit that splits the first image information into the split image files so as to each have a data size satisfying a restriction in image processing performed by the second image forming apparatus,
   an adding unit that adds first additional information to each of the split image files, the first additional information indicating whether or not to add an image formation unit mark, the image formation unit mark indicating boundaries between batches of image formation units corresponding to images to be formed on a plurality of pages, and
   an output unit that outputs the split image files added with the first additional information to the image forming apparatus; and
a forming unit that forms images based on each of the split image files acquired by the acquiring unit, so that the image formation unit mark is formed in the image if the first additional information added to the split image file indicates addition of the image formation unit mark, and the image formation mark is not formed in the image if the first additional information added to the split image file indicates non addition of the image formation unit mark.

11. An image forming apparatus comprising:
an acquiring unit that acquires a plurality of split image files from an image information converting apparatus, the image information converting apparatus comprising
a converting unit that converts first image information described in a first language into second image information described in a second language, the first language being used in a first image forming apparatus, the second language being used in a second image forming apparatus and different from the first language,
   a splitting unit that splits the first image information into the split image files so as to each have a data size satisfying a restriction in image processing performed by the second image forming apparatus,
   an adding unit that adds first additional information to each of fine names of the split image files, the first additional information indicating whether or not to add an image formation unit mark, the image formation unit mark indicating boundaries between batches of image formation units corresponding to images to be formed on a plurality of pages, and
   an output unit that outputs the split image files added with the first additional information to the image forming apparatus; and
a forming unit that forms images based on each of the file names of the split image files acquired by the acquiring unit, so that the image formation unit mark is formed in the image if the first additional information added to the file name of the split image file indicates addition of the image formation unit mark, and the image formation mark is not formed in the image if the first additional information added to the file name of the split image file indicates non addition of the image formation unit mark.

12. An image information converting system comprising:
the image information converting apparatus of claim 1; and
a forming apparatus that forms an image indicated by the second image information described in the second language, the second image information being processed by the image information converting apparatus.

13. A non-transitory computer readable medium storing an image information converting program that causes a computer to function as each unit constituting the image information converting apparatus of claim 1.

14. An image information converting method comprising:
converting first image information described in a first language into second image information described in a second language, the first language being used in a first image forming apparatus, the second language being used in a second image forming apparatus and different from the first language;
splitting the first image information into a plurality of split image files so as to each have a data size satisfying a restriction in image processing performed by the second image forming apparatus; and
adding first additional information to each of the split image files, the first additional information indicating whether or not to add an image formation unit mark, the image formation unit mark indicating boundaries between batches of image formation units corresponding to images to be formed on a plurality of pages.

* * * * *